(12) United States Patent
Mayringer

(10) Patent No.: US 7,484,482 B1
(45) Date of Patent: Feb. 3, 2009

(54) VALVE ASSEMBLY FOR A TWO-STROKE ENGINE

(75) Inventor: Ernst Mayringer, Ruestorf (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 9 days.

(21) Appl. No.: 11/625,734

(22) Filed: Jan. 22, 2007

(51) Int. Cl.
*F02B 25/00* (2006.01)
(52) U.S. Cl. .................................. 123/65 PE
(58) Field of Classification Search ............... 123/65 PE
See application file for complete search history.

(56) References Cited

U.S. PATENT DOCUMENTS 6,216,648 B1  4/2001  Spaulding
6,244,227 B1  6/2001  Matte
2005/0166872 A1  8/2005  Zauner

*Primary Examiner*—Noah Kamen
(74) *Attorney, Agent, or Firm*—Osler, Hoskin & Harcourt LLP

(57) ABSTRACT

A valve assembly suitable for use with an exhaust port of a two-stroke internal combustion engine is disclosed. The valve assembly has a valve actuator including a diaphragm and a pressure chamber, and a valve operatively connected to the actuator. The pressure chamber is fluidly connectable to at least one pressure source, via a pressure control device. The valve is movable to one of a first, a second, and a third position when a corresponding one of a first, a second, and a third pressure is supplied to the pressure chamber by the at least one pressure source. The valve is biased towards the third position. The third pressure is insufficient to overcome the bias. The third position is intermediate the first position and the second position. A method of operating the valve assembly is also disclosed.

22 Claims, 14 Drawing Sheets

VALVE ASSEMBLY FOR A TWO-STROKE ENGINE

FIELD OF THE INVENTION

The present invention relates to a valve assembly suitable for use with an exhaust port of a two-stroke internal combustion engine and a method of operating such a valve assembly.

BACKGROUND OF THE INVENTION

In order to ensure that two-stroke engines have a high power capacity at high speeds, a high volumetric efficiency is required and the charge losses must be minimized. This can be accomplished by an early and therefore higher opening of the exhaust passage into the cylinder. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with a lower fuel consumption can be obtained, at lower engine speeds, only if the opening of the exhaust port happens later in the down stroke of the piston which means that the exhaust port must be at a lower position than it is at high engine speeds.

For this purpose it is known to provide, in the exhaust port, a valve which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

United States Patent Application Publication No. 2005/0166872A1, published on Aug. 4, 2005 to Zauner and assigned to the assignee of the present application, entitled "Exhaust-Outlet Control for 2-Stroke Engine", discloses a valve assembly having a valve provided, in part, in the exhaust port which is connected to an actuator for moving the valve between a full flow position and a flow restricting position. The actuator includes a pressure chamber defined in part by a diaphragm. The valve is connected to the diaphragm. A spring biases the diaphragm such that the valve is biased towards the flow restricting position. When a positive pressure is supplied to the pressure chamber which is sufficient to overcome the bias of the spring, the volume of the pressure chamber increases, which moves the valve to the full flow position.

U.S. Pat. No. 6,216,648, issued on Apr. 17, 2001 to Spaulding, entitled "Internal Combustion Engine With Pneumatically Controlled Variable Exhaust Valve", discloses a valve assembly having a valve provided, in part, in the exhaust port which is connected to an actuator for moving the valve between a full flow position and a flow restricting position. The actuator includes a diaphragm located in a pressure chamber. The valve is connected to the diaphragm. By selectively supplying positive and negative pressures to the pressure chamber, the diaphragm moves in one direction or the other. Depending of which direction the diaphragm moves in, the valve moves to the corresponding full flow or flow restricting position.

Although both Zauner and Spaulding properly control the height of the exhaust port for operating at high engine speeds and at low engine speed by providing corresponding full flow and flow restricting positions, neither of them allow for reliably moving the valve to an intermediate position for operating at medium engine speeds. It may be possible to supply a pressure to the pressure chamber of Zauner which would move the valve to an intermediate position. However, for a given pressure, the volume of the pressure chamber would be different depending on the temperature. Due to the close positioning of the valve assembly relative to the engine, the temperature can vary significantly, and therefore, so would the volume of the pressure chamber. Therefore, in order to obtain the same intermediate position consistently, the pressure necessary to obtain the intermediate position would need to be consistently recalculated, which is both difficult and impractical.

Therefore, there is a need for a valve assembly suitable for use with an exhaust port of a two-stroke internal combustion engine having a valve which can be moved between a full flow position, an intermediate position, and a flow restricting position.

SUMMARY OF THE INVENTION

It is an object of the present invention to ameliorate at least some deficiencies of the prior art.

It is also an object of the present invention to provide a valve assembly including an actuator and a valve movable by the actuator, where the valve is movable between a full flow position, an intermediate position, and a flow restricting position, and where the valve is biased towards the intermediate flow position.

It is also an object of the present invention to provide a method of operating such a valve assembly.

In one aspect, the invention provides a valve assembly suitable for use with an exhaust port of a two-stroke internal combustion engine. The valve assembly has a valve actuator. The valve actuator includes a diaphragm and a pressure chamber defined at least in part by the diaphragm. The pressure chamber is fluidly connectable to at least one pressure source, via a pressure control device. The pressure chamber has a volume variable in response at least in part to pressure supplied to the pressure chamber by the at least one pressure source. The valve assembly also has a valve operatively connected to the actuator. The valve is movable to a first position when a first pressure is supplied to the pressure chamber by the at least one pressure source. The valve is movable to a second position when a second pressure is supplied to the pressure chamber by the at least one pressure source. The valve is biased towards a third position. The valve is movable to the third position when a third pressure is supplied to the pressure chamber by the at least one pressure source. The third pressure is insufficient to overcome the bias. The third position is intermediate the first position and the second position.

In a further aspect, the valve assembly also has a spring biasing the valve towards the third position.

In an additional aspect, the spring is disposed inside the pressure chamber.

In a further aspect, when the valve is in the first position, the spring is in compression, when the valve is in the second position, the spring is in extension, and when the valve is in the third position, the spring is in a position intermediate position of the spring when the valve is in the first and second positions.

In an additional aspect, the valve assembly also has a pressure chamber wall connected to the diaphragm. The pressure chamber is defined between the diaphragm and the pressure chamber wall. The valve is operatively connected to the pressure chamber wall.

In a further aspect, the first pressure is a negative pressure, the second pressure is a positive pressure, and the third pressure is an ambient pressure.

In an additional aspect, the valve is a two-part valve having a first valve part and a second valve part.

In a further aspect, the first valve part is movable between the first, second, and third positions. The second valve part is movable to a fourth position when any one of the first pressure and the third pressure is supplied to the pressure chamber by the at least one pressure source. The second valve part is movable to a fifth position when the second pressure is supplied to the pressure chamber by the at least one pressure source.

In an additional aspect, the valve assembly also has at least one spring for biasing the second valve part towards the fourth position. The first valve part is operatively connected to the diaphragm. The first valve part moves the second valve part to the fifth position when the first valve part moves to the second position.

In a further aspect, the valve is a main valve. The valve assembly also has at least one auxiliary valve being separate from and movably connected to the main valve.

In an additional aspect, the pressure control device includes at least one solenoid valve.

In a further aspect, the at least one pressure source is at least two separate pressure sources.

In an additional aspect, an internal combustion engine has a crankcase, a crankshaft disposed in the crankcase, a cylinder block connected to the crankcase, a cylinder disposed in the cylinder block, a piston movably disposed within the cylinder and being operatively connected to the crankshaft, and the above-described valve assembly operatively connected to the cylinder block. When the valve is in the first position, the valve extends a first distance in the exhaust port. When the valve is in the second position, the valve is withdrawn from the exhaust port. When the valve is in the third position, the valve extends a second distance in the exhaust port. The second distance is less than the first distance. The engine operates on a two-stroke principle.

In another aspect, the invention provides a method of operating a valve assembly suitable for use with an exhaust port of a two-stroke internal combustion engine. The valve assembly includes a valve actuator. The valve actuator includes a pressure chamber defined at least in part by a flexible diaphragm. The pressure chamber is fluidly connectable to at least one pressure source via a pressure control device. The pressure chamber has a volume variable in response at least in part to pressure supplied to the pressure chamber via the at least one pressure source. The valve assembly also includes a movable valve operatively connected to the valve actuator. The method comprises moving the valve to a first position by supplying a first pressure to the pressure chamber via the at least one pressure source, moving the valve to a second position by supplying a second pressure to the pressure chamber via the at least one pressure source, and biasing the valve towards a third position. The third position is intermediate the first position and the second position.

In a further aspect, the method further comprises moving the valve to the third position by supplying a third pressure to the pressure chamber via the at least one pressure source. The third pressure is insufficient to overcome the bias.

In an additional aspect, the first pressure is a negative pressure, the second pressure is a positive pressure, and the third pressure is an ambient pressure.

In a further aspect, the valve is a two-part valve having a first valve part and a second valve part. The method further comprises moving the first valve part between the first, second, and third positions, moving the second valve part to a fourth position when any one of the first pressure and the third pressure is supplied to the pressure chamber by the at least one pressure source, and moving the second valve part to a fifth position when the second pressure is supplied to the pressure chamber by the at least one pressure source.

In an additional aspect, the method further comprises biasing the second valve part towards the fourth position, and engaging the second valve part with the first valve part when the first valve part moves to the second position to move the second valve part to the fifth position.

In a further aspect, the method further comprises selectively fluidly communicating the pressure chamber with a first pressure source for supplying the first pressure to the pressure chamber, selectively fluidly communicating the pressure chamber with a second pressure source for supplying the second pressure to the pressure chamber, and selectively fluidly communicating the pressure chamber with a third pressure source for supplying the third pressure to the pressure chamber.

In an additional aspect, a crankcase of an internal combustion engine associated with the valve assembly provides the first and second pressure sources.

In a further aspect, the valve also includes at least one auxiliary valve being separate from and movably connected to the valve. The method further comprises moving the auxiliary valve together with the valve.

It is another object of the present invention to provide a method of operating a valve assembly suitable for use with an exhaust port of a two-stroke internal combustion engine. The valve assembly includes a valve actuator. The valve actuator includes a pressure chamber defined at least in part by a flexible diaphragm. The pressure chamber is fluidly connectable to at least one pressure source via a pressure control device. The pressure chamber has a volume variable in response at least in part to pressure supplied to the pressure chamber via the at least one pressure source. The valve assembly also includes a movable valve operatively connected to the valve actuator. The method comprises moving the valve from a third position to a first position by supplying a first pressure to the pressure chamber via the at least one pressure source, moving the valve from the third position to a second position by supplying a second pressure to the pressure chamber via the at least one pressure source, and returning the valve to the third position when a third pressure is supplied to the pressure chamber via the at least one pressure source. The third pressure is intermediate the first pressure and the second pressure. The third position is intermediate the first position and the second position.

In another aspect, the invention provides a valve assembly having a valve actuator. The valve actuator includes a valve housing, a diaphragm having a first portion connected to the housing, a pressure chamber defined at least in part by the diaphragm, and a spring operatively connected to the diaphragm. The pressure chamber fluidly communicates with at least one pressure source. The valve assembly also has a valve disposed at least partially in the valve housing and being operatively connected to the diaphragm. The diaphragm moves the valve to a first position when a first pressure is supplied to the pressure chamber by the at least one pressure source. The diaphragm moves the valve to a second position when a second pressure is supplied to the pressure chamber by the at least one pressure source. The diaphragm moves the valve to a third position when a third pressure is supplied to the pressure chamber by the at least one pressure source. The third position is an intermediate position between the first and the second position. The spring biases the diaphragm such that the valve is biased towards the third position.

For purposes of this application, the terms "ambient pressure" mean a pressure of the surrounding fluid. The terms "positive pressure" mean a pressure which is greater than an ambient pressure. The terms "negative pressure" mean a pressure which is lower than an ambient pressure. The terms "neutral position" used in conjunction with a spring mean that the spring is not in extension or in compression.

Embodiments of the present invention each have at least one of the above-mentioned objects and/or aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
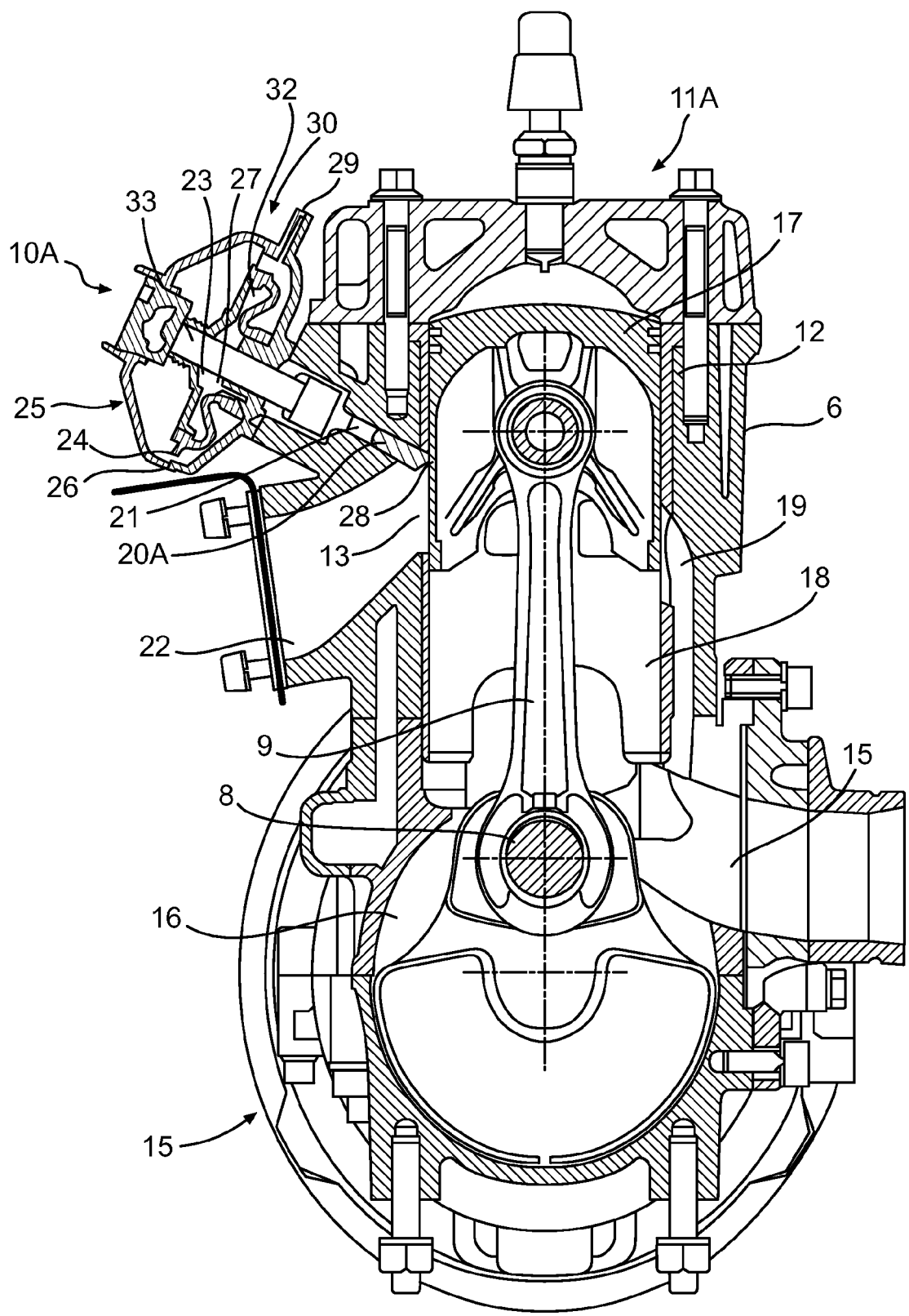
FIG. 1 is a cross-sectional view of a two-stroke engine having a first embodiment of a valve assembly in accordance with aspects of the present invention.

A valve assembly 10 in accordance with aspects of the present invention, which is described in greater detail below, comprises a valve actuator 30 and a valve 20 connected to the actuator 30. In FIG. 1, a first embodiment of the valve assembly 10 is valve assembly 10A having the actuator 30 and where the valve 20 is a one-part valve 20A. As shown in FIG. 1 the valve assembly 10A is operatively connected to a two-stroke engine 11A. It should be understood that the terms "two-stroke engine" include an engine having at least one cylinder such as a one, two, three or more cylinder engine. The engine 11A comprises a crankcase 14 and a cylinder block 6 connected to the crankcase 14. A cylinder 12, disposed in the cylinder block 6, has an exhaust port 13. An exhaust passage 22 communicates with the exhaust port 13. The crankcase 14 has an admission port 15 and an internal chamber 16. A crankshaft 8 is disposed in the internal chamber 16 of the crankcase 14. A piston 17 is connected to the crankshaft 8 via a connecting rod 9 and is reciprocable in the cylinder bore 18. The piston 17 is adapted to open or close the exhaust port 13 and a transferring port 19.

When the engine 11A is operating at low or medium speeds, the exhaust port 13 should not be exposed prematurely by the piston 17, as the latter moves downwardly. Such a premature exposure of the exhaust port 13 is prevented by the valve 20A. The valve 20A is slidably mounted in a guide channel 21 having a longitudinal direction that is approximately radial with respect to cylinder bore 18 and extends at an acute angle to the axis of the exhaust passage 22. An edge 28 of the valve 20A is shaped so as to match the shape of the cylinder bore 18 of the cylinder 12. As will become apparent from the following description, the valve actuator 30 is adapted to move the valve 20A between a first flow restricting position where the valve 20A extends a first distance in the exhaust port 13, a second full flow position where the valve 20A is withdrawn from the exhaust port 13, and a third intermediate position where the valve 20A extends a second distance in the exhaust port 13, such that it is in a position which is intermediate the first position and the second position. Since the second distance is less than the first distance, the valve 20A, when in the third position, does not restrict the flow of exhaust gases through the exhaust port 13 as much as when it is in the first position. The valve actuator 30 biases the valve 20A towards the third position.

Figure 2:
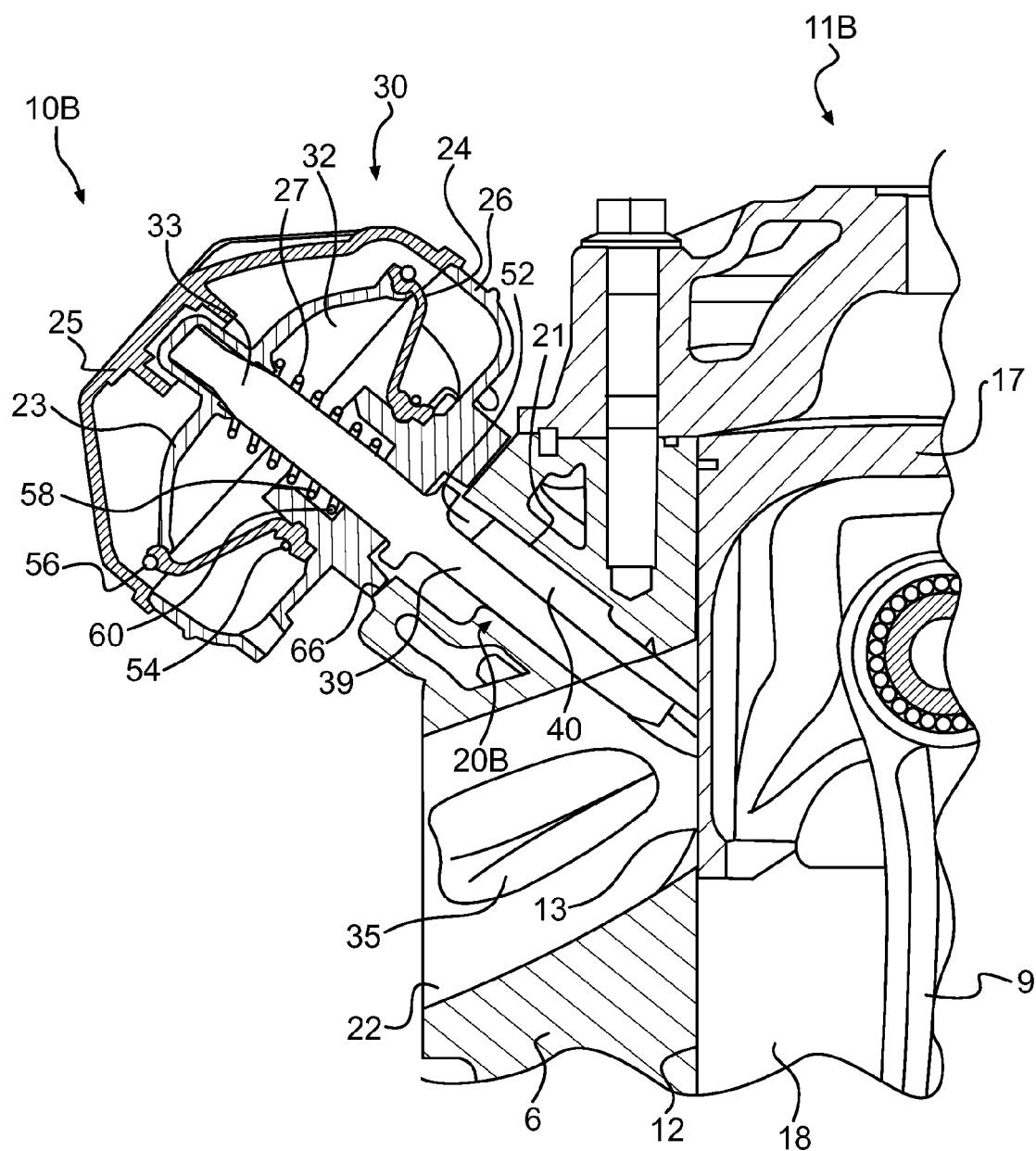
FIG. 2 is a cross-sectional view of a two-stroke engine having a second embodiment of a valve assembly in accordance with aspects of the present invention, a valve of the valve assembly having a first valve part and a second valve part.
Figure 3:
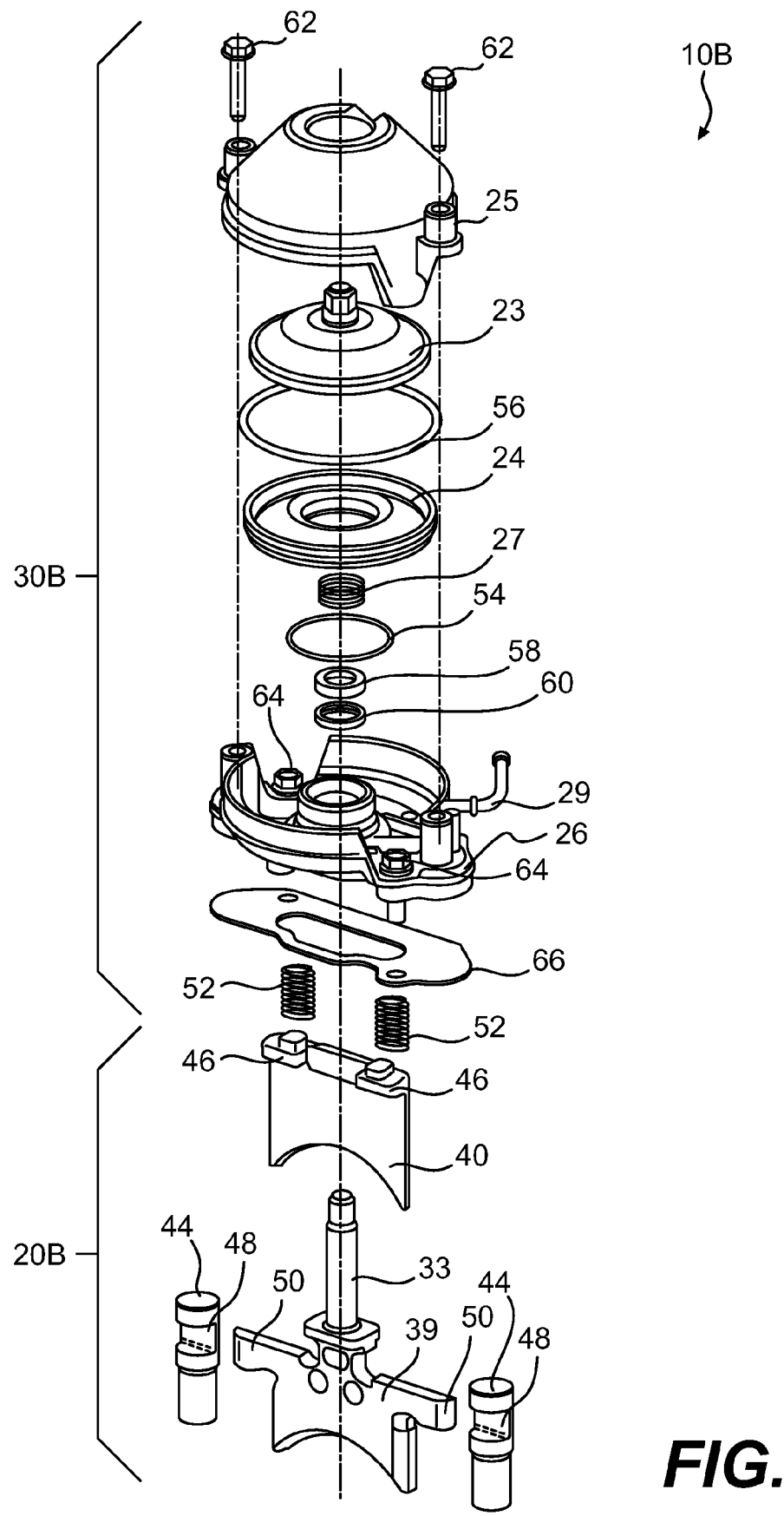
FIG. 3 is an exploded view of the valve assembly of FIG. 2.
Figure 4:
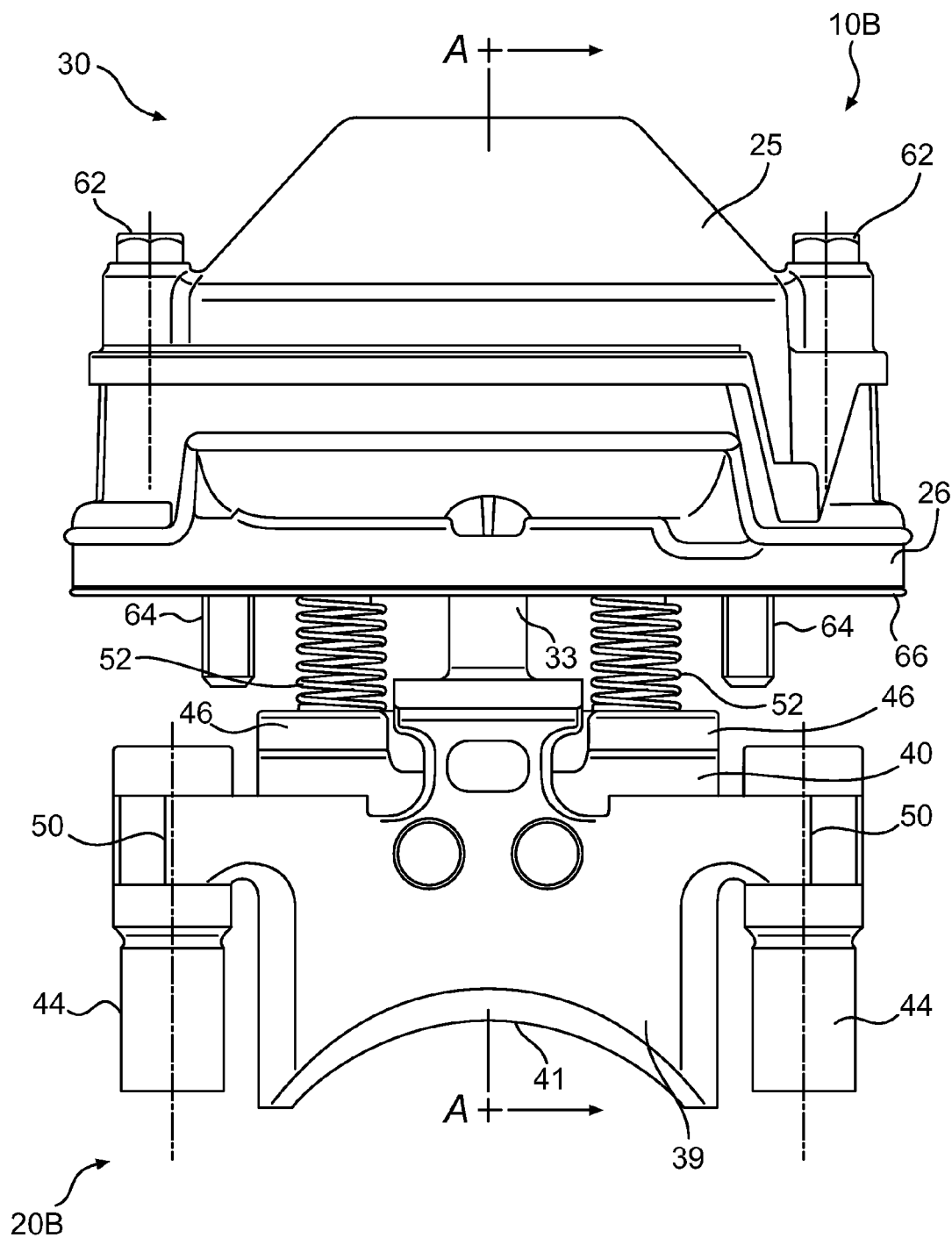
FIG. 4 is a side elevation view of the valve assembly of FIG. 2.
Figure 5:
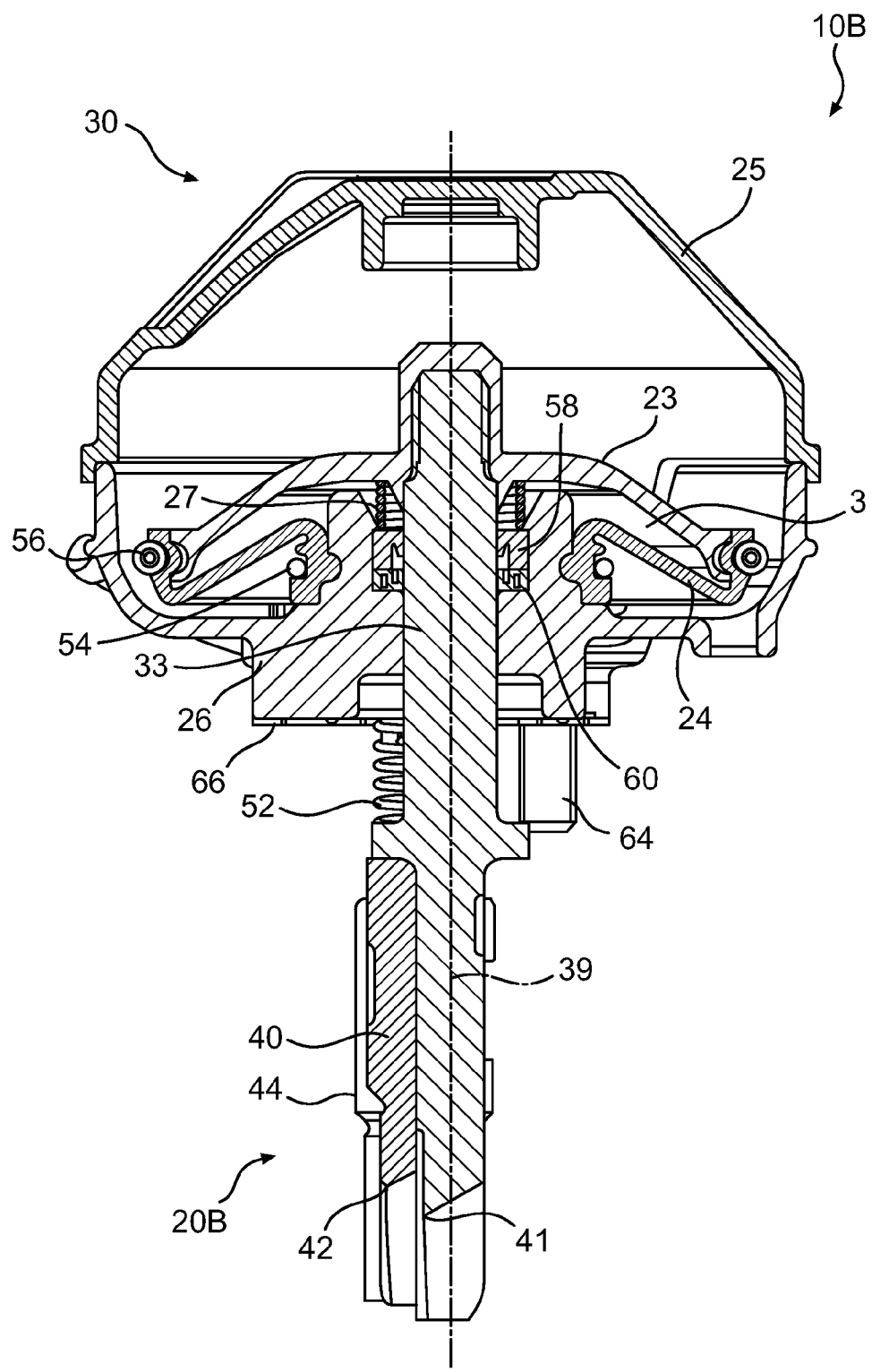
FIG. 5 is a cross-sectional view, taken through line A-A of FIG. 4, of the valve assembly of FIG. 2.
Figure 6:
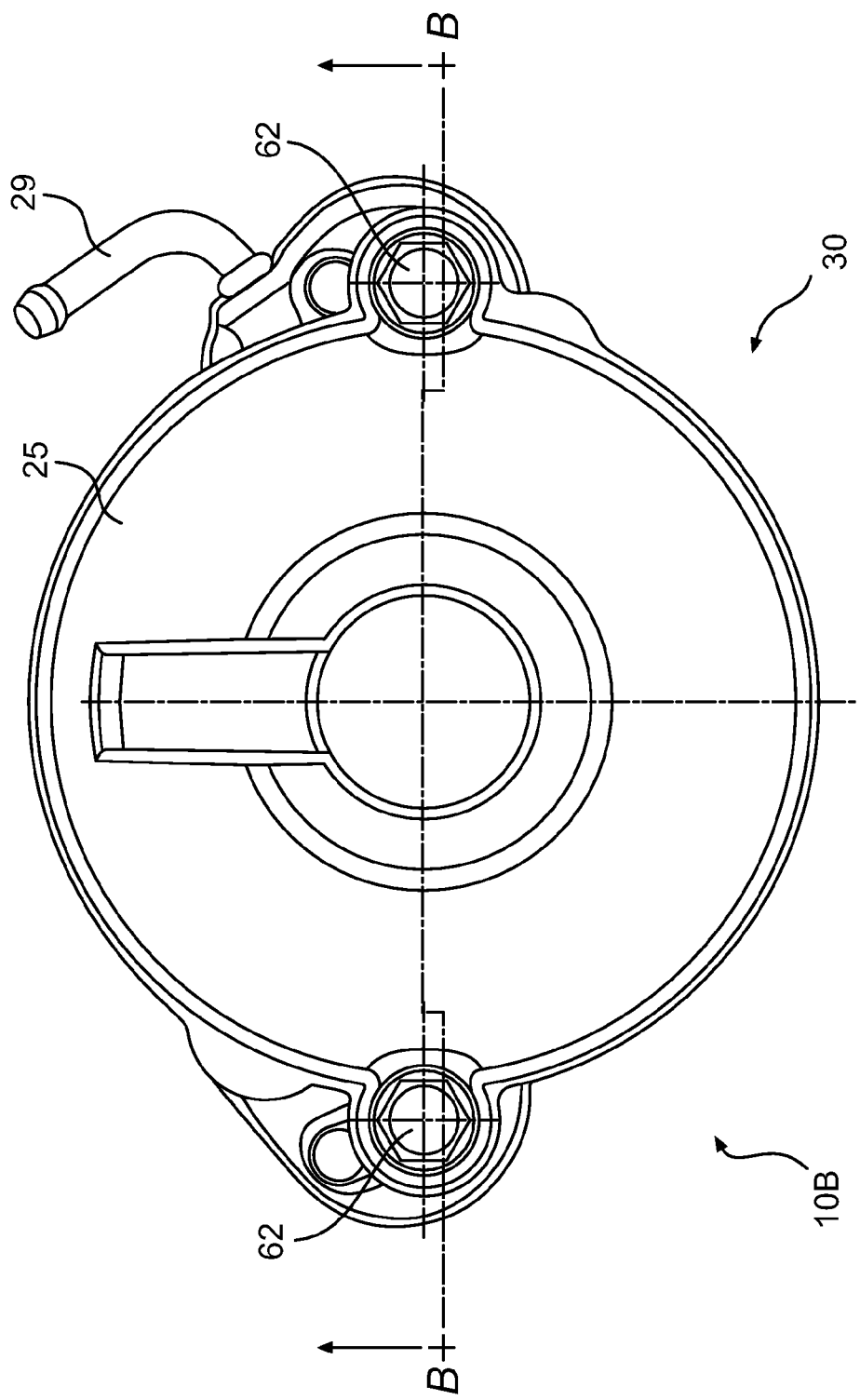
FIG. 6 is a top view of the valve assembly of FIG. 2.
Figure 7:
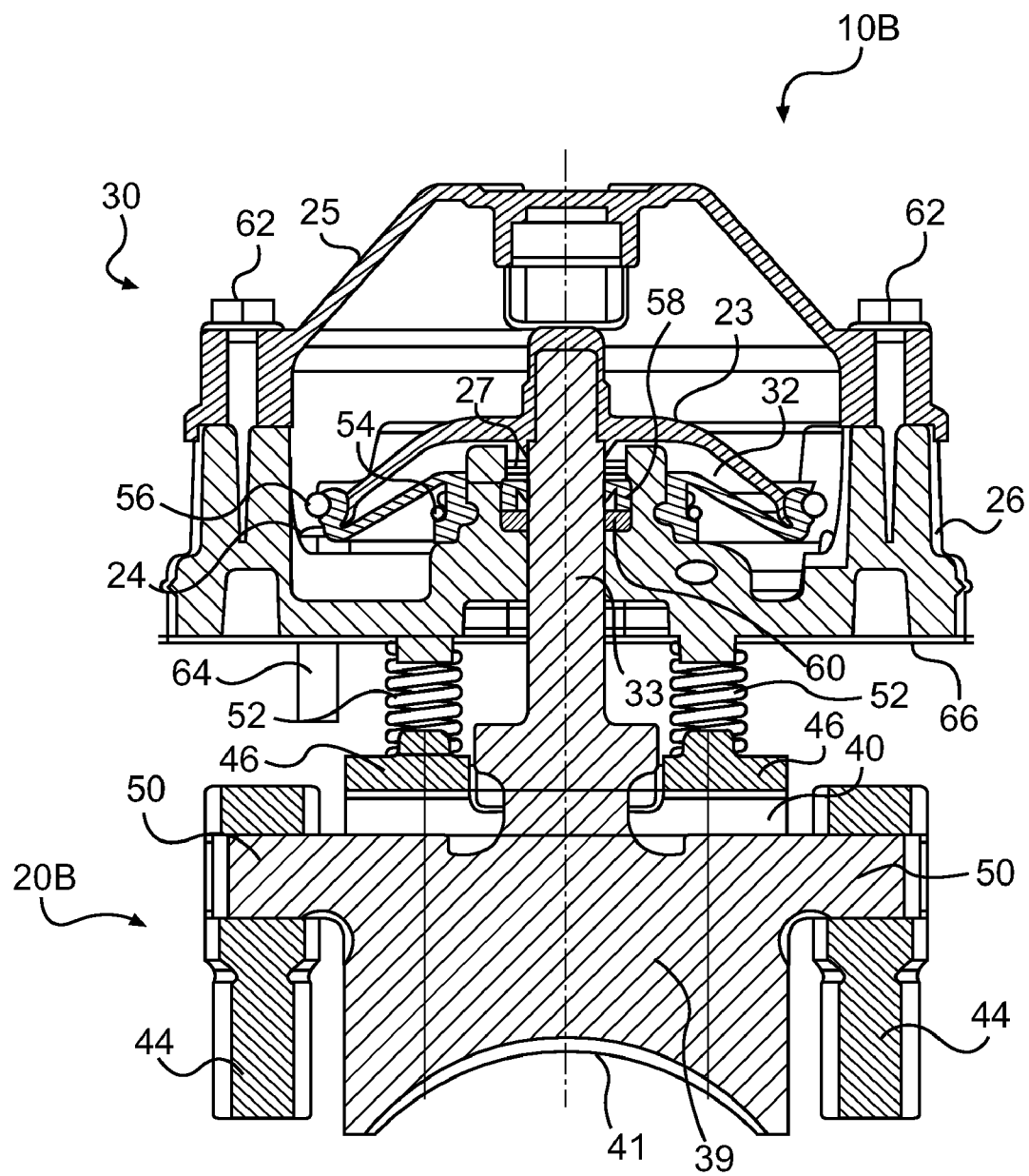
FIG. 7 is a cross-sectional view, taken through line B-B of FIG. 6; of the valve assembly of FIG. 2.
Figure 9A:
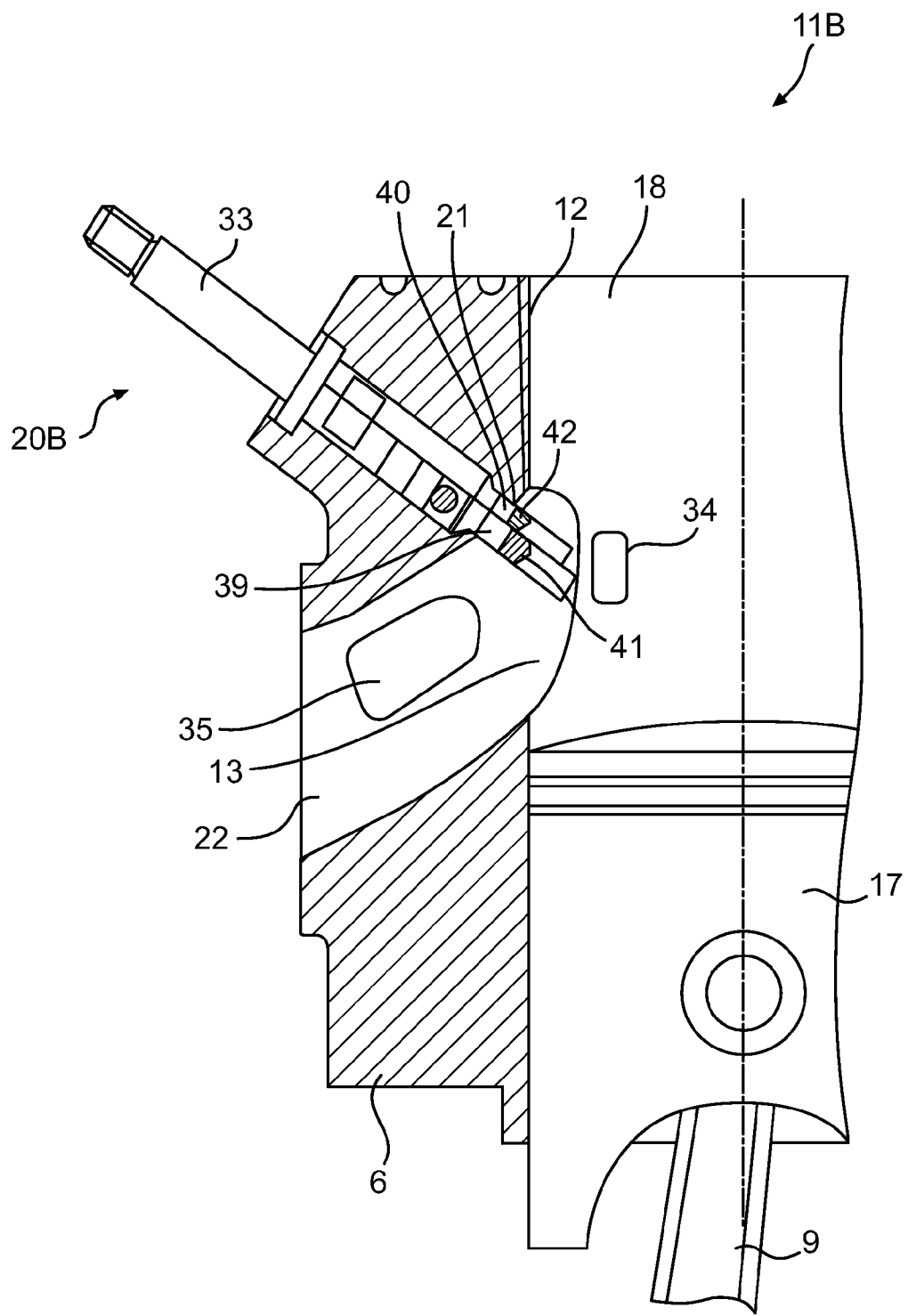
FIG. 9A is a schematic cross-sectional view of the engine of FIG. 2 with the first valve part in a flow restricting position and the second valve part in a flow restricting position.
Figure 9B:
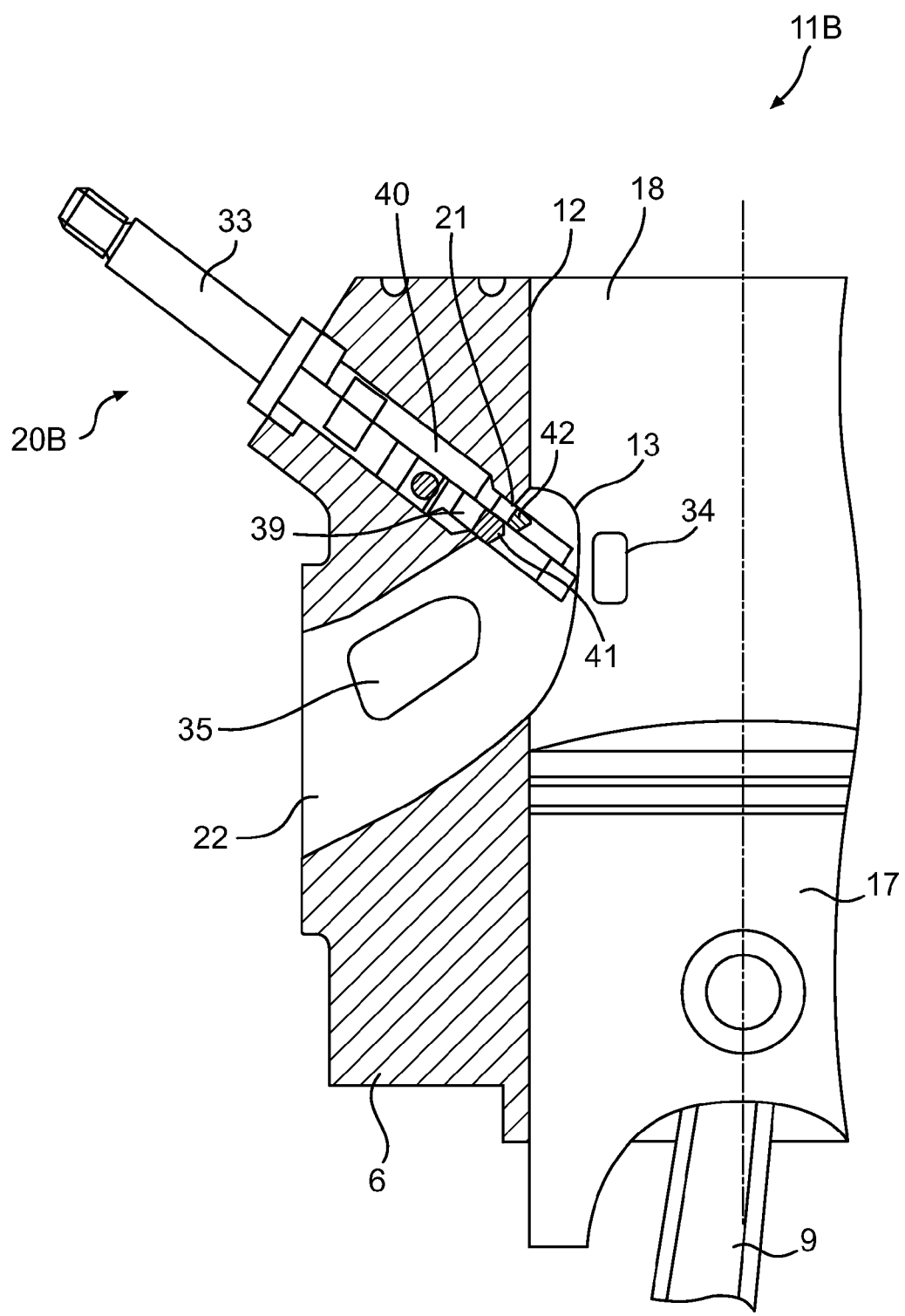
FIG. 9B is a schematic cross-sectional view of the engine of FIG. 2 with the first valve part in an intermediate position and the second valve part in the flow restricting position.
Figure 9C:
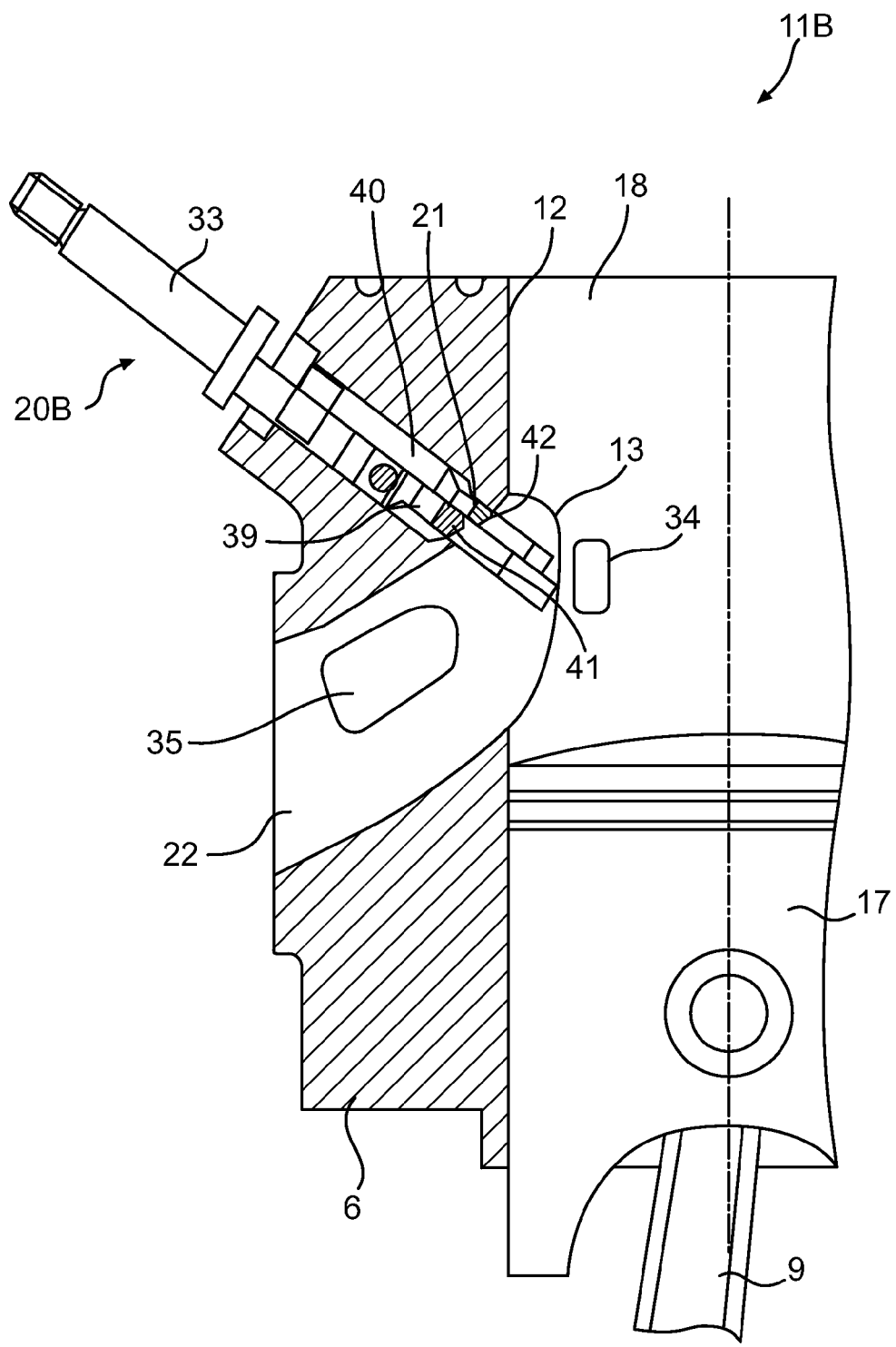
FIG. 9C is a schematic cross-sectional view of the engine of FIG. 2 with the first valve part in a full flow position and the second valve part in a full flow position.

Turning now to FIG. 2, a second embodiment of the valve assembly 10, valve assembly 10B, is shown which has the actuator 30 and where the valve 20 is a two-part valve 20B, described in greater detail below. As shown in FIG. 2 the valve assembly 10B is operatively connected to a two-stroke engine 11B. In addition to the components described above with respect to engine 11A, which have been labelled with the same reference numerals and which will not be described again, the engine 11B has, as best seen in FIGS. 9A to 9C, auxiliary exhaust ports 34 disposed so as to be symmetrical to the main exhaust port 13. The auxiliary exhaust ports 34 are connected to the exhaust passage 22 by way of auxiliary passages 35. Auxiliary guide channels (not shown) are provided parallel to the guide channel 21 in the area of the auxiliary passages 35 to receive auxiliary valves 44, described in greater detail below, which are associated with the two-part valve 20B.

Turning now to FIGS. 3 to 7, the two-part valve 20B will now be described. The two-part valve 20B includes a first valve part 39 and a second valve part 40. The first valve part 39 and the second valve part 40 each have an edge 41, 42, respectively, shaped so as to match the shape of the cylinder bore 18 of the cylinder 12. In operation, as in FIG. 2, the second valve part 40 is supported and is disposed above the first valve part 39. The first valve part 39 has an integrally formed connector 33 which connects the first valve part 39 to the actuator 30. The second valve part 40 has shoulders 46 which are engaged by the first valve part 39 as the first valve part 39 is moved to a full flow position, as described in greater detail below. A pair of springs 52 is provided between the second valve part 40 and a bottom of the valve actuator 30. The two-part valve 20B also has auxiliary valves 44 for restricting the flow of exhaust gases in the auxiliary exhaust passages 35. The auxiliary valve 44 are separate from and movably connected with the first valve part 39 via apertures 48 (FIG. 3) in the auxiliary valves 44 which engage tabs 50 of the first valve part 39.

The valve actuator 30 will now be described with respect to FIGS. 2 to 7. The valve actuator 30 has a valve housing 26. A first end portion of a diaphragm 24 is connected via a first annular spring 54 onto the valve housing 26. A pressure chamber wall 23 is connected to a second end portion of the diaphragm 24 via a second annular spring 56. The diaphragm 24 and the pressure chamber wall 23 define therebetween a pressure chamber 32 which has a variable volume. The connector 33 of the first valve part 39 passes through the valve housing 26 and is connected to the pressure chamber wall 23 so as to move therewith. A ring 58 and a sealing ring 60 are disposed between the valve housing 26 and the connector 33 to guide the connector 33 as it moves with the pressure chamber wall 23 and to prevent exhaust gases from entering the pressure chamber 32 from the guide channel 21. A spring 27 is disposed inside the pressure chamber 32 around the connector 33 between the pressure chamber wall 23 and the ring 58. The spring 27 biases the first valve part 39 towards a third intermediate position, shown in FIGS. 9B and 10B, described in greater detail below. It is contemplated that the spring 27 could be located elsewhere and still bias the first valve part 39 towards the third intermediate position, such as between the first valve part 39 and a bottom of the valve housing. It is also contemplated that the spring 27 could be omitted completely and that the diaphragm 24 could be self-biasing so as to bias the first valve portion 39 towards the third intermediate position, by properly shaping the diaphragm 24 and by making it out of an appropriate material. A cover 25 is connected to the valve housing 26 by bolts 62 to enclose the pressure chamber wall 23 and diaphragm 24 assembly therebetween. The valve housing 26 is connected to the cylinder block 6 via bolts 64. A seal 66 is disposed between the valve housing 26 and the cylinder block 6 to prevent exhaust gases from leaving the exhaust passage 22 via the guide channel 21. A port (not shown) of the pressure chamber 32 disposed on the valve housing 26 fluidly communicates the pressure chamber 32 with at least one pressure source, via a pressure control device, as described below. Another port 29 disposed on the valve housing 26 is used to ventilate the room surrounding the pressure chamber 32.

Figure 8:
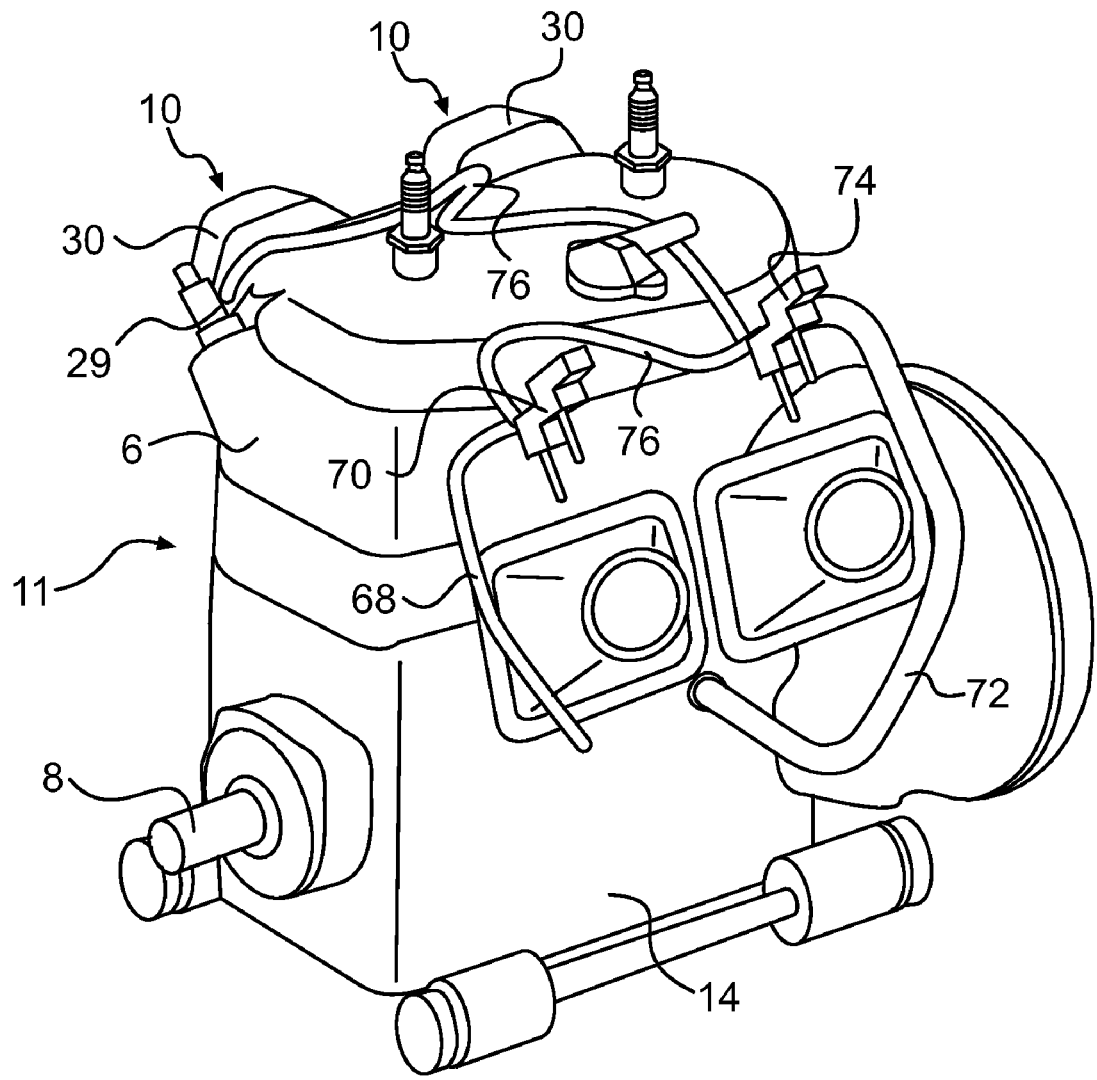
FIG. 8 a perspective view of a two-stroke engine having valve assemblies in accordance with aspects of the present invention, and a pressure control device.

FIG. 8 illustrates one possible embodiment of a pressure control device for fluidly communicating the pressure chambers 32 of two valve actuators 30 with a plurality of pressure sources. During operation of the engine 11, positive and negative pressures are created inside the crankcase 14. A first line 68 fluidly communicates the crankcase 14 with a first solenoid valve 70. A first one-way valve (not shown) is disposed in the first line 68 to only permit a positive pressure to be supplied to the first solenoid valve 70. A second line 72 fluidly communicates the crankcase 14 with a second solenoid valve 74. A second one-way valve (not shown) is disposed in the second line 72 to only permit a negative pressure to be supplied to the second solenoid valve 74. Lines 76 fluidly communicate the first and second solenoid valves 70, 74 with the ports of the pressure chambers 32 of the valve actuators 30. By selectively opening and closing the solenoid valves 70, 74, it is thus possible to supply one of a positive pressure and a negative pressure to the pressure chambers 32 of the valve actuators. A third valve (not shown) selectively fluidly communicates the pressure chambers 32 with the air surrounding the engine 11 so as to supply an ambient pressure to the pressure chambers 32. It is contemplated that a pressure equivalent to an ambient pressure could be supplied to the pressure chamber 32 by supplying controlled amounts of both the positive and the negative pressures by using solenoid valves 70 and 74. An electronic control unit (not shown) determines which pressure is to be supplied to the pressure chambers 32 based on the engine speed, as described below, and opens and closes the valves accordingly so as to obtain a desired position of the valve 20 of the valve assembly 10. It is contemplated that the electronic control unit could also determines which pressure is to be supplied to the pressure chambers 32 based on a degree of throttle opening or a rate of acceleration of the engine 11. Other pressure control devices are contemplated, such as those disclosed in U.S. Pat. No. 6,244,227 B1, issued Jun. 12, 2001 to Matte, entitled "Valve Assembly Using Pressurized Medium for Controlling Operating Conditions of a Two-Stroke Engine", the entirety of which is enclosed herewith by reference.

Figure 10A:
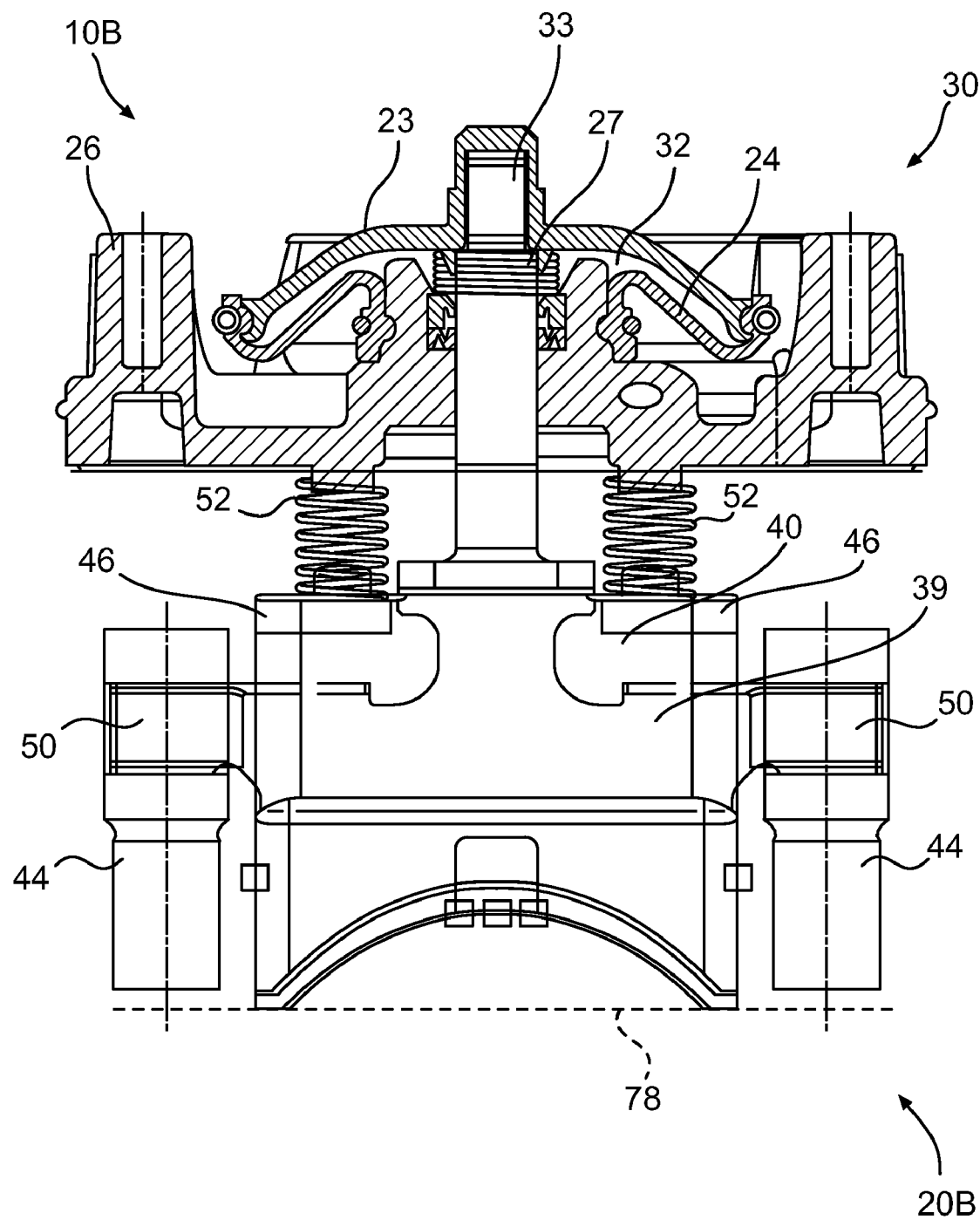
FIG. 10A is a cross-sectional view of the valve assembly of FIG. 4 with the first valve part in a flow restricting position and the second valve part in a flow restricting position.
Figure 10B:
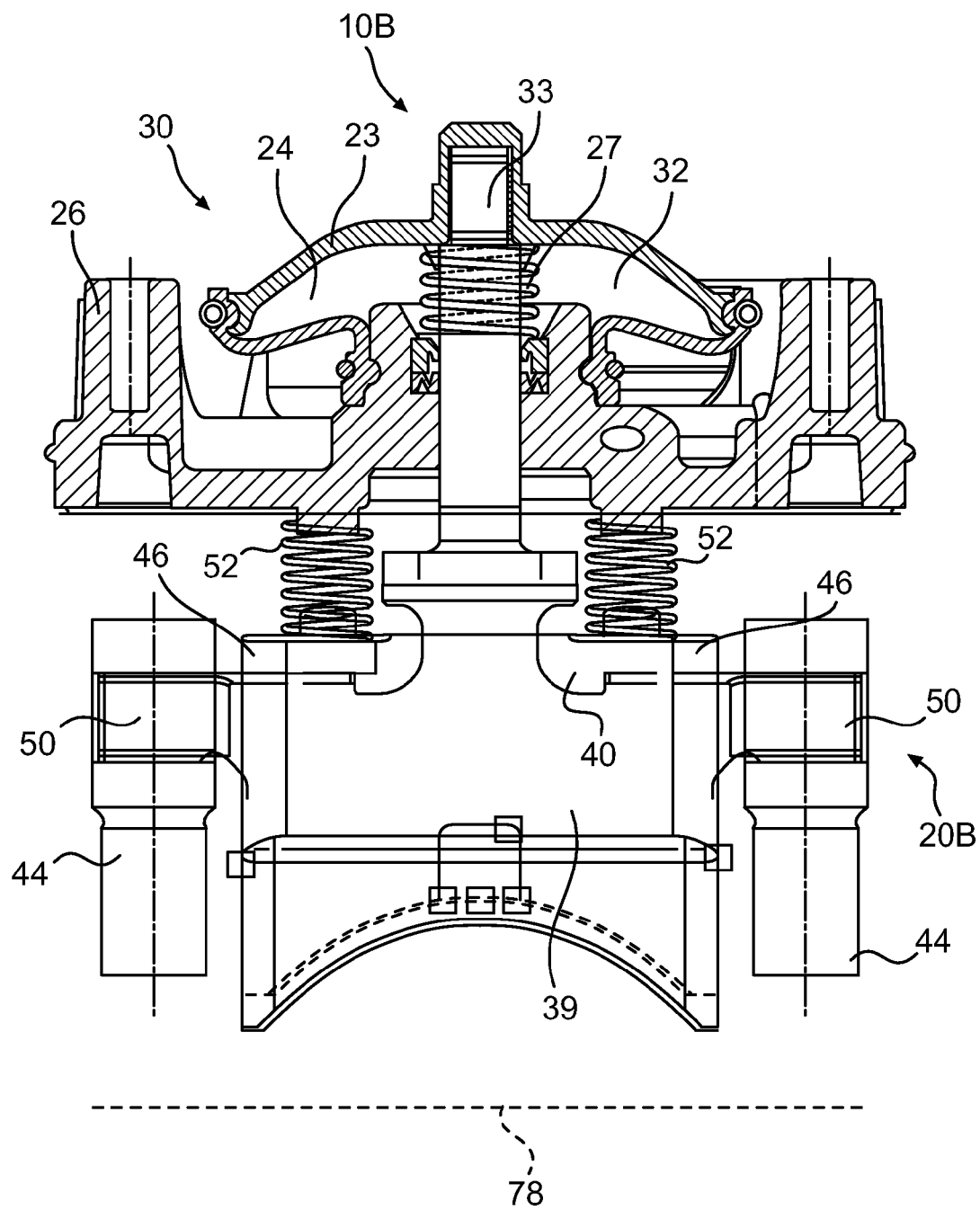
FIG. 10B is a cross-sectional view of the valve assembly of FIG. 4 with the first valve part in an intermediate position and the second valve part in the flow restricting position.
Figure 10C:
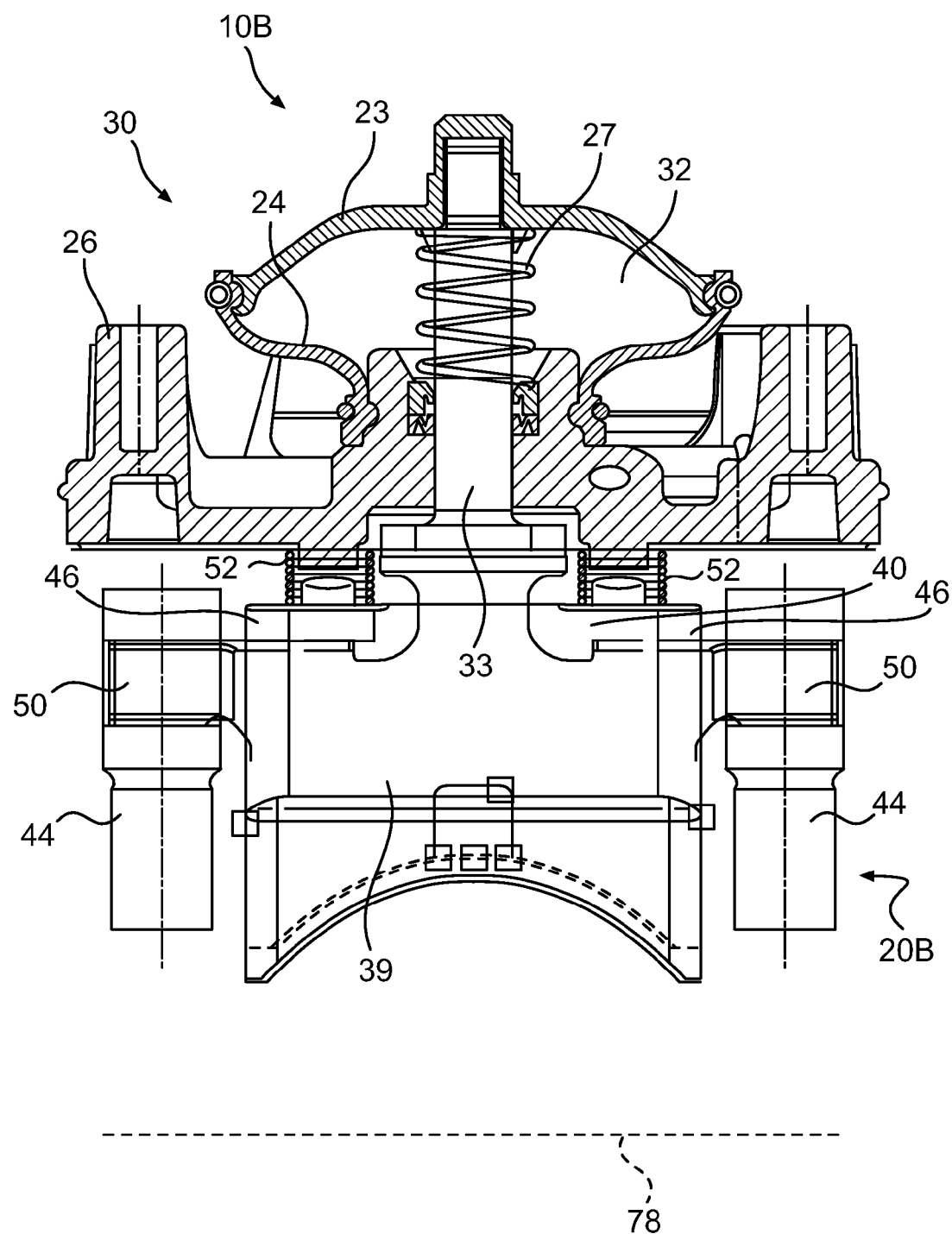
FIG. 10C is a cross-sectional view of the valve assembly of FIG. 4 with the first valve part in a full flow position and the second valve part in a full flow position.

The operation of the valve assembly 10B will now be described in association with FIGS. 9A to 10C. Line 78 in FIGS. 10A to 10C is a line passing through the points where the ends of the edge 41 of the first valve part 39 meet the cylinder bore 18 when the first valve part is in its first flow restricting position shown in FIG. 10A. Line 78 has been added simply to illustrate the movement of the valve 20B relative to the cylinder bore 18.

As previously mentioned, at low engine speeds, it is desirable to restrict the flow of the exhaust gases through the exhaust port 13 and auxiliary exhaust ports 34. Thus, at low engine speeds, the valve 20B is moved to the position shown in FIGS. 9A and 10A. To move the valve 20B to this position, a negative pressure is supplied to the pressure chamber 32. Since the negative pressure is sufficient to overcome the bias of the spring 27, the volume of the pressure chamber 32 is decreased. This causes the spring 27 to be in compression and the pressure chamber wall 23 moves the first valve part 39 in a first flow restricting position in the exhaust port 13. The auxiliary valves 44 which move with the first valve part 39 also move to a flow restricting position in the auxiliary exhaust passages 35. The second valve part 40 is held in a flow restricting position by the bias of springs 52.

At high engine speeds, it is desirable that the exhaust gases flow freely through the exhaust port 13 and auxiliary exhaust ports 34. Thus, at high engine speeds, the valve 20B is moved to the position shown in FIGS. 9C and 10C. To move the valve 20B to this position, a positive pressure is supplied to the pressure chamber 32. Since the positive pressure is sufficient to overcome the bias of the spring 27, the volume of the pressure chamber 32 is increased. This causes the spring 27 to be in extension and the pressure chamber wall 23 moves the first valve part 39 in a second full flow position where it is withdrawn from the exhaust port 13. The auxiliary valves 44 which move with the first valve part 39 also move to a full flow position where they are withdrawn from the auxiliary exhaust passages 35. As it is moved to its second full flow position, the first valve part 39 engages the shoulders 46 of the second valve part 40 and moves the second valve part 40 to a full flow position. When the second valve part 40 is in its full flow position the springs 52 are in compression.

At medium engine speeds, it is desirable to restrict the flow of the exhaust gases through the exhaust port 13 and auxiliary exhaust ports 34, but to a lesser degree than at low engine speeds. Thus, at medium engine speeds, the valve 20B is moved to the position shown in FIGS. 9B and 10B. To move the valve 20B to this position, an ambient pressure is supplied to the pressure chamber 32. Since the ambient pressure is insufficient to overcome the bias of the spring 27, the volume of the pressure chamber 32 is changed to reach a volume where the spring 27 is slightly compressed. The spring 27 is slightly compressed due to the bias applied by springs 52 on the first valve part 39 via the shoulders 46 of the second valve part 40. The pressure chamber wall 23 moves the first valve part 39 in a third intermediate position in the exhaust port 13. The auxiliary valves 44 which move with the first valve part 39 also move to an intermediate position in the auxiliary exhaust passages 35. The intermediate positions are intermediate their corresponding full flow and flow restricting positions. The second valve part 40 is held in its flow restricting position by the bias of springs 52.

Since the spring 27 biases the valve 20B towards the position shown in FIGS. 9B and 10B, the spring 27 will normally return the valve 20B to this position every time the pressure chamber 32 is supplied with the ambient pressure as the ambient pressure will normally be insufficient to overcome the bias of the spring 27. This allows for a position of the valve 20B suitable for operation at medium engine speeds to be reliably obtained.

It is contemplated that the component of the valve actuator 30 could be rearranged such that a positive pressure would move the valve 20B in the position shown in FIGS. 9A and 10A and a negative pressure would move the valve 20B in the position shown in FIGS. 9C and 10C. It is also contemplated that a pressure other than an ambient pressure could be supplied to the pressure chamber 32 to move the valve 20B to the position shown in FIGS. 9B and 10C by using a spring 27 which would be in a neutral position when this other pressure is supplied. It should be understood that positions of the valve 20B intermediate those shown in FIGS. 9A to 10C could be achieved by supplying other pressures to the pressure chamber 32.

Operation of the valve assembly 10A is similar to the operation of the valve assembly 10B in that the valve 20A is actuated generally in the same way as the first valve part 39 of the valve assembly 10B, and, except for the difference described below, will therefore not be described again. The main difference between the operation of the actuators 30 of valve assemblies 10A and 10B, is that since valve assembly 10A does not have springs 52, at medium engine speeds, the volume of the pressure chamber 32 is changed to reach a volume where the spring 27 is in a neutral position.

An engine 11 having a valve assembly 10A or 10B as described above could be used to drive different types of vehicles such as a motorcycle, a snowmobile, an all-terrain vehicle, or a personal watercraft for example.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A valve assembly suitable for use with an exhaust port of a two-stroke internal combustion engine, the valve assembly comprising:
    a valve actuator, the valve actuator including:
        a diaphragm; and
        a pressure chamber defined at least in part by the diaphragm, the pressure chamber being fluidly connectable to at least one pressure source, via a pressure control device, the pressure chamber having a volume variable in response at least in part to pressure supplied to the pressure chamber by the at least one pressure source;
    a valve operatively connected to the actuator, the valve being movable to a first position when a first pressure is supplied to the pressure chamber by the at least one pressure source, the valve being movable to a second position when a second pressure is supplied to the pressure chamber by the at least one pressure source, the valve being biased towards a third position, the valve being movable to the third position when a third pressure is supplied to the pressure chamber by the at least one pressure source, the third pressure being insufficient to overcome the bias, the third position being intermediate the first position and the second position; and
    a spring biasing the valve towards the third position.

2. The valve assembly of claim 1, wherein the spring is disposed inside the pressure chamber.

3. The valve assembly of claim 1, wherein when the valve is in the first position, the spring is in compression;
    wherein when the valve is in the second position, the spring is in extension; and
    wherein when the valve is in the third position, the spring is in a position intermediate a position of the spring when the valve is in the first and second positions.

4. The valve assembly of claim 1, further comprising a pressure chamber wall connected to the diaphragm;
    wherein the pressure chamber is defined between the diaphragm and the pressure chamber wall; and
    wherein the valve is operatively connected to the pressure chamber wall.

5. The valve assembly of claim 1, wherein the first pressure is a negative pressure;
    wherein the second pressure is a positive pressure; and
    wherein the third pressure is an ambient pressure.

6. The valve assembly of claim 1, wherein the valve is a two-part valve having a first valve part and a second valve part.

7. The valve assembly of claim 6, wherein the first valve part is movable between the first, second, and third positions;
    wherein the second valve part is movable to a fourth position when any one of the first pressure and the third pressure is supplied to the pressure chamber by the at least one pressure source; and
    wherein the second valve part is movable to a fifth position when the second pressure is supplied to the pressure chamber by the at least one pressure source.

8. The valve assembly of claim 7, further comprising at least one spring for biasing the second valve part towards the fourth position;
    wherein the first valve part is operatively connected to the diaphragm; and
    wherein the first valve part moves the second valve part to the fifth position when the first valve part moves to the second position.

9. The valve assembly of claim 1, wherein the valve is a main valve; and
    further comprising at least one auxiliary valve being separate from and movably connected to the main valve.

10. The valve assembly of claim 1, wherein the pressure control device includes at least one solenoid valve.

11. The valve assembly of claim 1, wherein the at least one pressure source is at least two separate pressure sources.

12. An internal combustion engine comprising:
    a crankcase;
    a crankshaft disposed in the crankcase;
    a cylinder block connected to the crankcase;

a cylinder disposed in the cylinder block;
a piston movably disposed within the cylinder and being operatively connected to the crankshaft; and
the valve assembly of claim 1 operatively connected to the cylinder block;
wherein when the valve is in the first position, the valve extends a first distance in the exhaust port;
wherein when the valve is in the second position, the valve is withdrawn from the exhaust port;
wherein when the valve is in the third position, the valve extends a second distance in the exhaust port, the second distance being less than the first distance; and
wherein the engine operates on a two-stroke principle.

13. A method of operating a valve assembly suitable for use with an exhaust port of a two-stroke internal combustion engine, the valve assembly including:
a valve actuator, the valve actuator including a pressure chamber defined at least in part by a flexible diaphragm, the pressure chamber being fluidly connectable to at least one pressure source via a pressure control device, the pressure chamber having a volume variable in response at least in part to pressure supplied to the pressure chamber via the at least one pressure source, and
a movable valve operatively connected to the valve actuator, the method comprising:
moving the valve to a first position by supplying a first pressure to the pressure chamber via the at least one pressure source;
moving the valve to a second position by supplying a second pressure to the pressure chamber via the at least one pressure source; and
biasing the valve towards a third position using a spring, the third position being intermediate the first position and the second position.

14. The method of claim 13, further comprising moving the valve to the third position by supplying a third pressure to the pressure chamber via the at least one pressure source, the third pressure being insufficient to overcome the bias.

15. The method of claim 14, wherein the first pressure is a negative pressure;
wherein the second pressure is a positive pressure; and
wherein the third pressure is an ambient pressure.

16. The method of claim 14, wherein the valve is a two-part valve having a first valve part and a second valve part, the method further comprising:
moving the first valve part between the first, second, and third positions;
moving the second valve part to a fourth position when any one of the first pressure and the third pressure is supplied to the pressure chamber by the at least one pressure source; and
moving the second valve part to a fifth position when the second pressure is supplied to the pressure chamber by the at least one pressure source.

17. The method of claim 16, further comprising:
biasing the second valve part towards the fourth position; and
engaging the second valve part with the first valve part when the first valve part moves to the second position to move the second valve part to the fifth position.

18. The method of claim 14, further comprising:
selectively fluidly communicating the pressure chamber with a first pressure source for supplying the first pressure to the pressure chamber;
selectively fluidly communicating the pressure chamber with a second pressure source for supplying the second pressure to the pressure chamber; and
selectively fluidly communicating the pressure chamber with a third pressure source for supplying the third pressure to the pressure chamber.

19. The method of claim 18, wherein a crankcase of an internal combustion engine associated with the valve assembly provides the first and second pressure sources.

20. The method of claim 13, wherein the valve further includes at least one auxiliary valve being separate from and movably connected to the valve, the method further comprising:
moving the auxiliary valve together with the valve.

21. A method of operating a valve assembly suitable for use with an exhaust port of a two-stroke internal combustion engine, the valve assembly including:
a valve actuator, the valve actuator including a pressure chamber defined at least in part by a flexible diaphragm, the pressure chamber being fluidly connectable to at least one pressure source via a pressure control device, the pressure chamber having a volume variable in response at least in part to pressure supplied to the pressure chamber via the at least one pressure source, and
a movable valve operatively connected to the valve actuator, the method comprising:
moving the valve from a third position to a first position by supplying a first pressure to the pressure chamber via the at least one pressure source;
moving the valve from the third position to a second position by supplying a second pressure to the pressure chamber via the at least one pressure source; and
returning the valve to the third position using a spring when a third pressure is supplied to the pressure chamber via the at least one pressure source, the third pressure being intermediate the first pressure and the second pressure, and the third position being intermediate the first position and the second position.

22. A valve assembly comprising:
a valve actuator, the valve actuator including:
a valve housing;
a diaphragm having a first portion connected to the housing;
a pressure chamber defined at least in part by the diaphragm, the pressure chamber fluidly communicating with at least one pressure source; and
a spring operatively connected to the diaphragm; and
a valve disposed at least partially in the valve housing and being operatively connected to the diaphragm;
the diaphragm moving the valve to a first position when a first pressure is supplied to the pressure chamber by the at least one pressure source;
the diaphragm moving the valve to a second position when a second pressure is supplied to the pressure chamber by the at least one pressure source;
the diaphragm moving the valve to a third position when a third pressure is supplied to the pressure chamber by the at least one pressure source, the third position being an intermediate position between the first and the second position; and
the spring biasing the diaphragm such that the valve is biased towards the third position.

\* \* \* \* \*